United States Patent [19]

Abramovici et al.

[11] Patent Number: 5,011,800

[45] Date of Patent: Apr. 30, 1991

[54] PROCESS FOR MAKING MOLYBDENUM DISILICIDE OR MOLYBDENUM DISILICIDE/ALUMINA COMPOSITIONS

[75] Inventors: Rudolf Abramovici, Depew; George T. Hida, North Tonawanda, both of N.Y.

[73] Assignee: Benchmrk Structural Ceramics Corporation, Amherst, N.Y.

[21] Appl. No.: 499,038

[22] Filed: Mar. 26, 1990

[51] Int. Cl.$^5$ .............................................. C04B 35/58
[52] U.S. Cl. ....................................... 501/96; 501/98; 423/344
[58] Field of Search ..................... 501/96, 98; 423/344

[56] References Cited

U.S. PATENT DOCUMENTS

| | | | |
|---|---|---|---|
| 2,982,619 | 5/1961 | Long | 501/96 X |
| 3,056,658 | 10/1962 | Brennan et al. | 423/344 |
| 3,350,214 | 10/1967 | Long | 501/96 X |
| 4,605,633 | 8/1986 | DeAngelis | 501/96 X |
| 4,626,516 | 12/1986 | Morelock | 501/96 X |

*Primary Examiner*—Karl Group
*Attorney, Agent, or Firm*—Howard J. Greenwald

[57] ABSTRACT

A process for preparing molybdenum disilicide or a molybdenum disilicide/alumina composition is provided. In the first step of this process, a mixture containing molybdenum oxide, silica, aluminum and/or magnesium, and inorganic diluent is provided; the mixture may also contain organic surfactant and/or organic binder. In the second step of the process, the mixture is ignited, thereby causing a self-propagating reaction to occur. Thereafter, the combusted product is cooled and then washed with water, preferably until it contains less than about 0.1 percent of inorganic diluent. When the combusted product contains magnesia, the magnesia is leached from the product by treatment with nitric acid and sodium hydroxide.

20 Claims, 1 Drawing Sheet

PROCESS FOR MAKING MOLYBDENUM DISILICIDE OR MOLYBDENUM DISILICIDE/ALUMINA COMPOSITIONS

FIELD OF THE INVENTION

An exothermic process for preparing molybdenum disilicide or molybdenum disilicide/alumina compositions. In this process, a mixture of molybdenum oxide, silicon dioxide, a metallic component, and an inorganic diluent react in a self-sustaining, highly-exothermic mode.

BACKGROUND OF THE INVENTION

Molybdenum disilicide is a useful material well known to the prior art; it is one of the very few commercially feasible materials used in high-temperature heating elements for oxidizing environments. Thus, for example, U.S. Pat. No. 3,027,331 of Schrewelius discloses the preparation of electrical resistance heating elements from molybdenum disilicide.

The conventional method for making molybdenum disilicide is very expensive, requiring both costly reagents and a substantial amount of heat. In this prior art method, molybdenum and silicon are heated at a temperature of from between about 1,400 to about 1,600 degrees centigrade for at least about 6 hours.

The materials used in the conventional method are very expensive. Thus, referring to the 1990–1991 Alfa Catalog (available from Alfa Products, Ward Hill, Mass.), molybdenum powder in the 3–7 micron particle size range (reagent number 10030) costs ninety-eight dollars per kilogram, and silicon powder with particle size smaller than 325 mesh (reagent 12681) is one-hundred-thirty-four dollars per kilogram. The molybdenum silicide available from Alfa Products (reagent number 11549) costs four-hundred-twelve dollars per kilogram.

Several attempts have been made to reduce the cost of producing molybdenum disilicide. Thus, U.S. Pat. No. 2,982,619 of Long describes a process in which elemental molybdenum and elemental silicon are heated to a temperature of 1,100 degrees centigrade, at which point an exothermic reaction occurs. U.S. Pat. No. 3,056,658 of Brennan et al. describes an exothermic process in which elemental molybdenum is reacted with elemental silicon. The aforementioned Schrewelius patent also discloses a similar exothermic reaction.

Even though the Long, Brennan, and Schrewelius patents describe processes which are more energy-efficient than prior molybdenum disilicide processes, they still require the use of expensive raw materials, elemental molybdenum and elemental silicon.

One of the means available to control a self-sustaining, highly exothermic synthesis (SHS) process is to moderate it with a material which will control the reaction front features and its motion, affect the yield, and minimize production of undesired by-product. The diluent/moderator must slow the reaction front only to a specified extent; too much moderation may extinguish the front.

It is an object of this invention to provide a process for the preparation of molybdenum disilicide in which an exothermic reaction between the reagents used occurs in matter of seconds.

It is another object of this invention to provide a process for the preparation of molybdenum disilicide which utilizes inexpensive, readily available raw materials.

It is a further object of this invention to provide an highly exothermic reaction for the production of molybdenum disilicide in which the reaction rate is moderated by the use a diluent which is readily removable from the reaction product by leaching with water.

SUMMARY OF THE INVENTION

In accordance with this invention, there is provided a process in which molybdenum oxide, silica, and a metal selected from the group consisting of aluminum, beryllium, magnesium, and mixtures thereof, undergo an exothermic reaction in the presence of an inorganic moderator/diluent.

BRIEF DESCRIPTION OF THE DRAWING

The present invention will be more fully understood by reference to the following detailed description thereof, when read in conjunction with the attached drawing, wherein like reference numerals refer to like elements and wherein.

DESCRIPTION OF THE PREFERRED EMBODIMENTS

Figure 1:
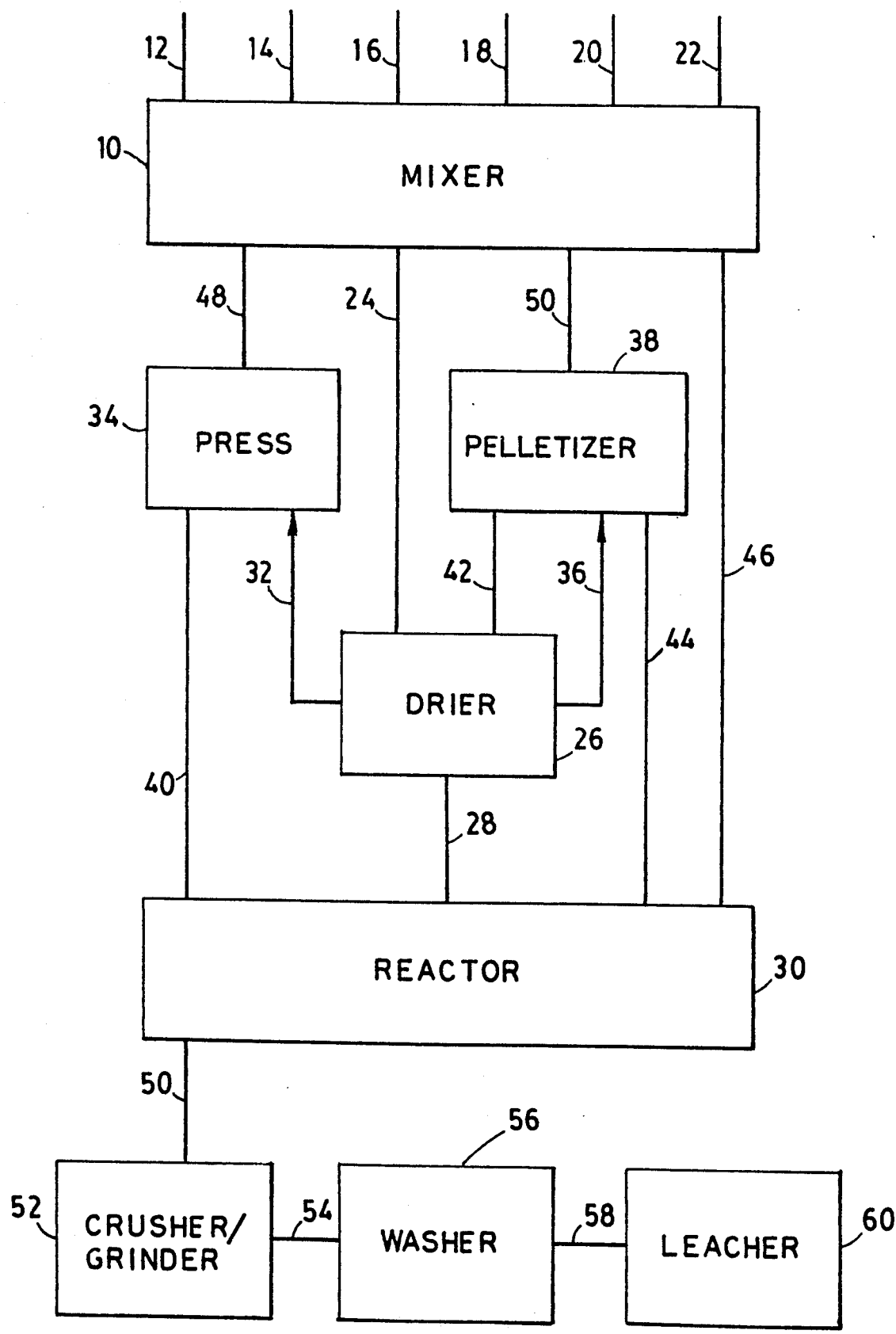
FIG. 1 is a flow diagram of one of the preferred processes of the invention.

One of the preferred processes of this invention will be described with reference to FIG. 1, which is a flow diagram.

Referring to FIG. 1, to a mixer 10 is charged molybdenum oxide ($MoO_3$), silicon dioxide, metal component (such as aluminum and/or magnesium and/or beryllium), and inorganic diluent via lines 12, 14, 16, and 18, respectively.

Mixer 10 can be any of mixing apparatuses well known to those skilled in the art. Thus, by way of illustration, one may use any of the mixing processes and/or apparatuses described in chapters 8 and 21 of Robert H. Perry et al.'s "Chemical Engineers' Handbook," Fifth Edition (McGraw-Hill Book Company, New York, 1973), the disclosure of which is hereby incorporated by reference into this specification. As is indicated in said chapters, suitable mixers include ball mills, jar mills, tumblers, Eirich mixers, and the like. When dry mixing is conducted, the ball mill is preferred. When wet mixing is conducted, the Eirich mixer is preferred.

In the embodiment where the metal component is selected from the group consisting of aluminum, magnesium, and mixtures thereof, a sufficient amount of molybdenum (Vi) oxide ($MoO_3$) is charged to mixer 10 via line 12 to provide a mixture comprised of from about 12 to about 34 percent of the molybdenum oxide, by weight of molybdenum oxide, silicon dioxide, the metal component, and the diluent; in this oxide compound, the molybdenum has a valence of 6. When the metal used consists essentially of aluminum, the concentration of the molybdenum oxide is from about 14 to about 34 percent. When the metal component used consists essentially of magnesium, the concentration of the molybdenum oxide is from about 12 to about 31 percent. When the metal component consists of a mixture of aluminum and magnesium, the amount of molybdenum oxide will range from about 12 to about 34 percent, depending upon the aluminum/magnesium ratio. This ratio also will affect the concentration of the alumina formed in the final composite material.

The molybdenum (VI) oxide ($MoO_3$) is preferably used in a powder form. It is preferred that this reagent be at least about 99 percent pure. Suitable molybdenum oxide ($MoO_3$) reagents are well known to those skilled in the art. Thus, by way of illustration and not limitation, one may use molybdenum (VI) oxide supplied by the Inorganic Chemicals, Ltd. company of Belleville, N. J., 07109. Reagent number MO-17 available from such company costs only about $14.00 per kilogram, which is substantially less than the $98 per kilogram charged by Alfa Products for elemental molybdenum.

When the metal component is selected from the group consisting of aluminum, magnesium, and mixtures thereof, a sufficient amount of silica is charged to mill 10 via line 14 to provide a mixture comprised of from about 10 to about 29 percent of silica, by weight of molybdenum (VI) oxide, silica, said metal component, and diluent. When the metal component is aluminum, from about 11 to about 29 weight percent of silica is used. When the metal component is magnesium, from about 10 to 27 weight percent of silica is used. When the metal component is a mixture of aluminum and magnesium, the amount of silica will range from about 10 to about 29 percent, depending upon the aluminum/magnesium ratio.

It is preferred that the silica be at least about 98 percent pure.

Many sources of such silica are known to those skilled in the art. Thus, e.g., one may use the silicon (IV) oxide available as reagent number 13024 from the aforementioned Alfa Products catalog. This material costs only about $5.25 per kilogram, which is substantially less than the $134 per kilogram charged by Alfa Products for elemental silicon.

The metal component, which is comprised of either aluminum and/or magnesium and/or beryllium, is added via line 16 to mixer 10. When the metal component is either aluminum and/or magnesium, a sufficient amount of such metal component is added via line 16 to provide a mixture is such mill which contains from about 12 to about 36 percent (by weight of molybdenum oxide, silica, metal component, and diluent) of said metal component. When the metal component consists essentially of aluminum, from about 12 to about 31 percent of such aluminum is charged via line 16. When the metal component consists essentially of magnesium, from about 14 to about 36 percent of such magnesium is charged via line 16. When the metal component is comprised of a mixture of aluminum and magnesium, from about 12 to about 36 percent of such component is charged, depending upon the aluminum/magnesium ratio in the component.

The aluminum used in the metal component preferably is at least 94 percent pure. Such aluminum material is well known to those skilled in the art and is available in the form of flakes, powder, and the like.

The magnesium used in the metal component is a powder which is preferably at least 98 percent pure. Such magnesium may be obtained from the 1990-1991 Alfa catalog (Johnson Matthey Alfa Products, P.O. Box 8247, Ward Hill, Ma.). Thus, e.g., referring to page 527 of this catalog, one may use reagent 00869, reagent 10234, or reagent 10233.

In addition to said molybdenum oxide, silica, and metal component, the mixture in mixer 10 also contains inorganic diluent. When the metal component is selected from the group consisting of aluminum, magnesium, and mixtures thereof, then the mixture contains from about 15 to about to about 60 weight percent (by combined weight of diluent, molybdenum oxide, silica, and metal component) of a specified inorganic diluent.

The inorganic diluent used in the process has a specified degree of water solubility. As is known to those skilled in the art, the solubility of a solid in a liquid is the mass of a substance contained in a solution which is in equilibrium with an excess of the substance at a specified temperature; see, e.g., page F-112 of the "CRC Handbook of Chemistry and Physics," 63rd edition (CRC Press, Inc., Boca Raton, Fla. , 1982-1983), the disclosure of which is hereby incorporated by reference into this specification.

It is preferred that the diluent be inorganic. The physical constants of inorganic compounds are described on pages B-73 to B-166 of said Handbook of Chemistry and Physics.

It is preferred that the inorganic diluent used in the process have a solubility in cold water (20 degrees centigrade) of at least about 20 grams per 100 cubic centimeters of such cold water. In one embodiment, it is more preferred that such solubility be at least about 25 grams per 100 cubic centimeters of such cold water. The solubility properties of inorganic compounds may be determined by reference to said Handbook of Chemistry and Physics.

In addition to the solubility property, the diluent should be stable under the conditions of the reaction, i.e., it should not decompose at a temperature of from about 1,500 to about 2,000 degrees centigrade. Whether a particular compound decomposes at this reaction temperature may be determined by reference to said CRC Handbook of Chemistry and Physics.

The diluent, under the conditions of reaction, must be nonreactive with all of the other reagents (the molybdenum oxide, the silica, the metal component) as well as with all of the intermediate and end products of the reaction (the molybdenum disilicide, the alumina, the magnesia, molybdenum, silicon, etc.). The reaction generally takes place at a temperature of from about 1,500 to about 2,000 degrees centigrade, depending upon the amount of diluent used and the concentrations of the various reagents. One may determine which reagents are nonreactive with each of the aforementioned reagents, intermediates, and end products at a temperature of from 1,500 to 2,000 degrees centigrade by referring to said CRC Handbook of Chemistry and Physics. Thereafter, for each of the inorganic compounds which meets this nonreactivity test, one can then determine which of them also meet the solubility test. An inorganic compound which meets both of these tests may be used as a diluent in the process.

Although the inorganic diluent has been discussed with regard to use in the molybdenum disilicide reaction, it is to be realized that it may also be used in other combustion synthesis reactions. The term "combustion synthesis," as used herein, refers to a highly-exothermic, self-propagating combustion process in which, after ignition of the reactants, the combustion front wave (the flame) moves through the mixture of reactants; and the energy for the propagation of the combustion front is supplied by the exothermic reaction.

Combustion synthesis reactions are well known to those skilled in the art and are described, e.g., in (1) William L. Frankhouser, "Advanced Processing of Ceramic Compounds" (Noyes Data Corporation, Park Ridge, N.J., 1987), (2) William L. Frankhouser et al., "Gasless Combustion Synthesis of Refractory Compounds" (Noyes Data Corporation, Park Ridge, N.J., 1985), and (3) Alexander G. Merzhanov, "Self-Propagating High Temperature Synthesis: 20 Years of Search and Findings," Keynote Talk, International Symposium on Combustion and Plasma Synthesis of High-Temperature Materials, San Francisco, Calif., Oct. 23-26, 1988, submitted for publication to the Ceramic Engineering and Science Proceedings, American Ceramic Society. The disclosure of each of these references is hereby incorporated by reference into this specification; and the diluent described herein may be advantageously used in the combustion synthesis reactions described in these references.

In general, the diluent may be advantageously used in any reaction in which the amount of heat generated is at least about 650 calories per mole of reactant. Thus, by way of illustration and not limitation, one may use the inorganic diluent as a moderator in metal/nonmetal highly exothermic self-propagating reactions, in thermite type reactions, and the like.

It is especially preferred to use the inorganic diluent in combustion synthesis reactions which have a calculated adiabatic temperature in excess of 1,500 degrees centigrade such as, e.g., thermite type reactions, reactions to obtain borides, carbides, and nitrides, etc.

In one preferred embodiment, the inorganic diluent is a salt of an metal compound. The metal compound is preferably a compound of an preferably alkali metal selected from the group consisting of sodium compounds and potassium compounds. In a more preferred embodiment, the diluent is a halide of sodium or potassium such as, e.g., potassium chloride, sodium chloride, and the like.

In another embodiment, the diluent is an inorganic salt of an alkaline earth metal such as, e.g., the inorganic salts of calcium, magnesium, barium, strontium, and the like.

In one preferred embodiment, the diluent is potassium chloride. Thus, by way of illustration and not limitation, one may use reagent number 11,595 of said Alfa catalog.

Although FIG. 1 illustrates a process in which the diluent, the molybdenum oxide, the silica, and the metal component are all mixed in mixer 10, it will be apparent that some of these components may be mixed separately and thereafter combined with each other. Thus, by way of illustration, one may mix the metal component, the molybdenum oxide, and the silica in one vessel, and, after such mixture is prepared, thereafter add diluent to it. Other possible mixing arrangements will be apparent to those skilled in the art.

In one preferred embodiment, from about 40 to about 60 weight percent of a first mixture comprised of aluminum, molybdenum oxide, and silica is mixed with from about 20 to about 40 weight percent of a second mixture comprised of molybdenum and silicon and from about 20 to about 30 weight percent of said inorganic diluent.

In one embodiment, a mixture of elemental molybdenum and silicon is added to the mixture containing aluminum, molybdenum oxide, silica, and, optionally, diluent. Thus, referring to FIG. 1, this mixture may be added via line 20. In this embodiment, from about 20 to about 40 percent of the mixture of molybdenum and silicon (by combined weight of diluent, molybdenum, silicon, silica, molybdenum oxide, and aluminum) is added.

When the component contains beryllium, or a mixture of beryllium and one or both of aluminum and/or magnesium, the aforementioned concentrations for the metal component, the silica, the molybdenum oxide, and the diluent will change because of the different stoichiometry of the reactions of beryllium with silicon dioxide and molybdenum oxide. The stoichiometry may be calculated by conventional means from a reaction in which 7 moles of beryllium are reacted with 1 mole of molybdenum oxide and 2 moles of silicon dioxide to form 1 mole of molybdenum disilicide and 7 moles of beryllium oxide.

In one preferred embodiment, in addition to the molybdenum oxide, the silica, the metal component, and the diluent, the mixture in mixer 10 may also contain from about 0.1 to about 0.5 weight percent of organic surfactant, which may be added via line 22. As used in this specification, the term "surfactant" refers to a surface active agent, i.e., a substance that alters energy relationships at interfaces. It is preferred that the surfactant be either anionic, cationic, or nonionic. Some suitable surfactants are described in U.S. Pat. No. 4,477,259 of Funk, the disclosure of which is hereby incorporated by reference into this specification.

In one preferred embodiment, the surfactant is a carboxylic acid containing from about 4 to about 26 carbon atoms. One preferred class of carboxylic acids is the saturated fatty acids containing from about 4 to about 26 carbon atoms. Another preferred class of carboxylic acids is the unsaturated fatty acids containing from about 4 to about 26 carbon atoms. One preferred fatty acid is oleic acid.

The mixture in mixer 10 may be wet mixed or dry mixed. If said mixture contains more than about 2.0 weight percent of liquid, it may be passed via line 24 to drier 26, where it may be dried to a liquid content of less than 2.0 percent. Thereafter the dried mixture may be passed via line 28 to reactor 30, where it may be ignited. Alternatively, or additionally, it may be passed via line 32 to press 34 and/or via line 36 to pelletizer 38. In press 34 and/or pelletizer 38, the mixture may be made into pellets. Pressed pellets from pres 34 may be passed via line 40 to reactor 30, where they may be ingited. If the pellets from pelletizer 38 contain more than 2.0 percent of moisture, they may be passed to drier 26 via line 42; after they are dried in the drier 26, they may then be introduced into reactor 30. If the pellets from pelletizer 38 contain less than 2.0 percent of moisture, they may be passed via line 44 to reactor 30.

When the mixture in mixer 10 is substantially dry, it may be passed directly via line 46 to reactor 30. Alternatively, or additionally, the mixture may be passed via line 48 (to press 34) and/or line 50 (to pelletizer 38) where it may be pelletized.

The mixture which is introduced into reactor 30, regardless of how it is prepared or whether it is in the shape of powder and/or pellets, should (1) contain the amounts specified above of molybdenum oxide, silica, metal component, and diluent, and (2) contain less than about 2.0 percent of liquid. It is preferred that the mixture introduced into ractor 30 contain less than about 0.1 percent of liquid.

In one preferred embodiment, the molybdenum oxide, the silica, the metal component(s), the diluent, and the organic surfactant are dry mixed in mixer 10. From about 2 to about 5 weight percent of an organic binder may be added to the mixture before or during the mixing. When such an organic binder is used, it is preferred to introduce it in the form of a non-aqueous solution to the mixture. Thus, by way of illustration and not limitation, when camphor is used as the organic binder, a sufficient amount of an acetone solution of camphor may be added to the mixture in mixer 10 so that said mixture contains from about 2 to about 5 weight percent of the camphor.

The dry mixing may be effected by any of the methods and/or apparatuses known to those skilled in the art. Thus, e.g., one may use any of the mixing processes and/or apparatuses described on pages 21-30 to 21-36 of Robert H. Perry and Cecil H Chilton's "Chemical Engineers' Handbook," Fifth Edition (McGraw-Hill Book Company, New York, 1973), the disclosure of which is hereby incorporated by reference into this specification. It is preferred to mix so that substantially no comminution takes place. Thus, in one embodiment, sintered alumina media are used in about a 1:1 ratio with the reaction mixture, and the mixing takes place until a homogeneous mixture is obtained.

The organic binder which may be used in the mixture serves to hold the mixture together and give the pressed pellets made from it sufficient strength and integrity for handling and subsequent ignition. Organic binders are described on pages 36-39 of the January, 1989 issue of "Ceramic Industry" and on pages 152-173 of James S. Reed's "Introduction to the Principles of Ceramic Processing" (John Wiley and Sons, New York, 1988); the disclosure of both of these publications is hereby incorporated by reference into this specification.

One preferred organic binder is camphor. As is known to those skilled in the art, camphor is a ketone occurring naturally in the wood of the camphor tree; it is often referred to as 2-camphanone.

Referring again to FIG. 1, in one preferred embodiment, a dry mixture from mixer 10 may be discharged by line 48 to press 34, where it may be pressed into pellets. It is preferred that the minimum size of the pellets be at least about 0.025 inches and, preferably, at least about 0.1 inches. The pellets may be in the shape of a cylinder, a bar, etc. The pressure used in the pelletizing should be sufficient to confer enough strength to the pellets so that they can be handled without disintegrating.

It is preferred to press the pellets at a pressure of at least about 100 pounds per square inch. Any conventional press may be used to pelletize the mixture from mixer 10. Thus, for example, one may use the presses described in Chapter 19 of said Perry and Chilton's handbook. Thus, e.g., one may use a hydraulic press. Thus, e.g., one may use the pressure compaction techniques described on pages 8-58 to 8-60 of said Perry and Chilton book. Thus, e.g., one may use the powder compacting presses sold by Pentronix, Inc. of Lincoln Park, Mich.

Alternatively, pellets made from the mixture in mixer mill 10 may be prepared by other conventional pelletizing methods using, e.g., an Eirich mixer; the Eirich mixer may be mixer 10 itself, or it may be pelletizer 38. Thus, when mixer 10 is an Eirich mixer, it will simultaneously mix and pelletize the mixture. The Eirich mixers are well known to those skilled in the art and are described in, e.g., bulletin 2000-487, entitled "Eirich Intensive Mixers: The complete range of mixers" (available from Eirich Machines, Inc., 10243 Keele Street, Maple, Ontario). The pelletizing technique using said mixers is described in "Pelletizing in Mix Pelletizers and Pelletizing Discs," by H. B. Ries, Hardheim, reprinted from Aufbereitungs-Technik Nr. 12/75 and available from Eirich Machines, Inc. The disclosure of each of these bulletins is hereby incorporated by reference into this specificiation.

In yet another embodiment, mixer 10 is an Eirich mixer, and a slurry is provided in Eirich mixer 10. The slurry is comprised of from about 60 to about 80 percent of the solid material mixture described above, from about 2 to about 5 weight percent of organic binder, and from about 40 to about 20 volume percent of non-aqueous liquid. In this embodiment, it is preferred to use a nonaqueous liquid which volatilizes at a temperature of about 60 degrees centigrade. Some suitable nonaqueous solvents include acetone, benzone, toluene, n-petroleum ether, and the like.

The mixture comprised of organic binder, nonaqueous liquid, diluent, molybdenum oxide, silica, and metal component may then be pelletized in the Eirich mixer in accordance with the mixing procedure described above. Alternatively, one may pelletize this mixture by pouring it into a tray and placing the tray in an oven to drive off liquid; chunks of material tend to form when the moisture content of the material is less than about 10 percent.

Regardless of the pelletizing process used, it is desired that the pellets formed have substantially the same maximum and minimum dimensions. Thus, it is preferred that at least about 80 percent of the pellets have maximum and minimum dimensions which are within 25 percent of the average maximum and minimum dimensions, respectively, of all of the pellets. In one embodiment, the average maximum dimension of the pellets or chunks of material is about 1.0 inch.

In another embodiment, loose powder from mixer 10 is ignited. In such embodiment, the loose powder is passed via line 46 to reactor 30, where it is ignited.

Material which contains more than about 2.0 weight percent of liquid may be dried in drier 26. Any of the drying means known to those skilled in the art may be used. Thus, e.g., one may use a conventional oven. The material is dried until it contains less than about 2.0 percent of liquid and, preferably, less than about 0.1 percent of liquid.

The dried material from dryer 26 may then be passed via line 28 to reactor 30, where it is ignited.

In one preferred embodiment, a minor portion of the surface of the pellet is ignited in reactor 30. After ignition of the pellet, combustion occurs, and the combustion front propagates throughout the pellet at a rate of from about 1 to about 15 centimeters per second.

The reacted material is then allowed to cool to ambient temperature under ambient conditions. The cooled material is then passed via line 50 to crusher/grinder 52, wherein it is crushed and ground, if necessary, until substantially all of its particles are smaller than about 150 microns.

The ground powder is then passed via line 54 to washer 56, wherein it is preferably mixed with water to remove the inorganic diluent. A sufficient amount of water is used for a sufficient time until the powder contains substantially no diluent; thus, in one preferred embodiment, the washing continues until the powder contains less than about 0.1 weight percent of inorganic diluent. The washing may occur with cold water or warm water. One may periodically anlayze a sample of the wash water to determine the presence of inorganic diluent as (a cation or anion) by standared qualitiative analysis techniques. Thus, by way of illustration and not limitation, one may use the qualitative analytical techniques described in V. Alexeev's "Analyse Qualitative," 3rd edition (Editions MIR., Moscou, 1975), the disclosure of which is hereby incorporated by reference into this specification.

When the material in mill 10 contains magnesium, it is preferred to pass the washed material from washer 56 via line 58 to leacher 60, wherein it is leached. The leaching process preferably involves at least two steps. In the first step of the leaching process, the material is treated with nitric acid, preferably at a concentration of about from about 15 to about 25 percent, in accordance with the procedure described in J. M. Coulson et al.'s "Chemical Engineering," Volume Two, Third Edition (Pergammon Press, Oxford, England, 1978), at pages 375-410, the disclosure of which is hereby incorporated by reference into this specification. In the second step of the leaching process, the material is treated with a solution of sodium hydroxide, preferably at a concentration of from about 15 to about 25 percent to destroy unwanted by-products or reactants, such as unreacted silicon dioxide, silicon, and the like.

The following examples are presented to illustrate the claimed invention but are not to be deemed limitative thereof. Unless otherwise specified, all a parts are by weight and all temperatures are in degrees centigrade. In each of these examples, from about 0.01 to about 0.5 weight percent of oleic acid was used to minimize dust formation during mixing.

EXAMPLE 1

27.45 grams of aluminum powder (reagent number 26,651-5, obtained from Aldrich Chemical Company, catalog 1988-1989), 31.37 grams of molybdenum oxide (reagent number MO-17, Inorganic Chemicals Ltd., Belleville, N.J.), 26.19 grams of silicon dioxide (reagent number 13024, (Alfa Catalog, 1990-1991, Johnson Matthey, Ward Hill, Mass.), 15.0 grams of potassium chloride diluent (reagent number 31,012-3, 1988-1989 Aldrich catalog), and 0.3 weight percent of oleic acid (catalog number OL 103, Spectrum Chemical Manufacturing Company, Gardena, Calif.) were charged to a laboratory jar mill equipped with alumina media; mixing occurred for 8 hours.

The mixture was then discharged to a stainless steel die with an interior diameter of 1.25 inches, and it was pelletized in such die with a Carver Lab Press 13-872 (see page 897 of the Fischer '88 catalog, Fischer Scientific, Pittsburg, Pa.); pressed pellets about 1.0 inch in height were obtianed. The pellets were then put into a graphite crucible and lined with "GRAFOIL" (a pure, flexible, graphite tape with highly directional properties similar to pyrolytic graphite, sold by Union Carbide Corporation); an oxyacetylene torch was ingnited, and its flame was directed to the edge of one of the pellets, thereby igniting it. A self-propagating reaction occurred in which the reaction front moved across the pellet at a rate of about 4.0 centimeters per second.

The combusted pellets were allowed to cool under ambient atmosphere, and then they were crushed with a mortar and pestle.

The crushed material was charged into a 500 milliliter beaker filled with water. The water/material mixture was then mixed with a magnetic stirrer for 2.0 hours. Thereafter, the water/material mixure was allowed to stand for another 8 hours.

The water/material mixture was filtered through a vacuum filtration funnel under vacuum. Thereafter, the filtered material was washed with distilled water until the filtrate produced by the washing contained no chloride ion.

The filtered material was then dried in an oven for 8 hours at 105 degrees centigrade. X-ray diffraction analysis of the dried material indicated that it contained mainly molybdenum disilicide and aluminia with traces of impurities.

EXAMPLE 2

In substantial accordance with the procedure of Example 1, 12.91 grams of aluminum, 14.76 grams of molybdenum oxide, 12.32 grams of silicon dioxide, and 60.0 grams of potassium chloride were formed into pellets and ignited. The combusted pellets, after cooling, were crushed for 5 minutes in a Brinkman model BBO Laboratory Jaw Crusher and then further processed in accordance with the procedure of Example 1.

The material produced contained mainly molybdenum disilicide and alumina with traces of impurities.

EXAMPLE 3

In substantial accordance with the procedure described in Example 1, 29.39 grams of magnesium (reagent number 00869, 1990-1991 Alfa catalog, Johnson Matthey, Ward Hill, Mass.) 24.86 grams of molybdenum oxide, 20.75 grams of silica, and 25.0 grams of potassium chloride were formed into pellets and combusted.

The combusted pellets were cooled and then crushed with a mortar and pestle. The crushed material was then washed in water and thereafter filtered in substantial accordance with the procedure of Example 1.

The filtered material obtained after the washing was charged into a Erlenmeyer beaker which contained a 20 percent solution of nitric acid. The beaker was then equipped with a Graham water condenser (see page 311 of the Fischer catalog), and the mixture in the beaker was heated to boiling and maintained at a boil for 30 minutes. Thereafter, in accordance with the procedure of Example 1, the mixture was filtered and then washed on a filter funnel until the pH of the filtrate was about 7.0.

The washed powder was then put into another Erlenmeyer flask which contained a 20 percent solution of sodium hydroxide. This mixture was then heated up to boiling for 20 minutes. Thereafter, the mixture was filtered, and the filtered material was washed with water on a filter funel until the pH of the filtrate was about 7.0.

The filtered material was dried an analyzed by X-ray diffraction, in accordance with the procedure of Example 1. It was found that the filtered material contained mainly molybdenum disilicide.

EXAMPLE 4

In substantial accordance with the procedure described in Example 3, 18.66 grams of magnesium, 18.17 grams of molybdenum oxide, 13.18 grams of silicon dioxide, and 50 grams of potassium chloride were used to prepare the pellets.

The molybdenum oxide, the silica, and the potassium chloride were first charged to the mill, and this mixture was mixed in a centrifugal ball mill (Centifugal Ball Mill S-1, Brinkman Instruments Company, see page 38 of the Brinkman R-1 catalog) along with 6 tungsten carbide balls having a total weight of 288 grams (see the Brinkan R-1 catalog, part number 27-17-474-4) at a speed of 540 revolutions per minute for 1 hour. Thereafter, the magnesium was charged to the mill, and mixing again occurred for another hour at 540 r.p.m.

The mixture was then pelletized, combusted, washed, and leached in accordance with the aforementioned procedure. The product obtained contained mainly molybdenum disilicide.

EXAMPLE 5

In substantial accordance with the procedure of Example 4, 18.66 grams of magnesium, 15.78 grams of molybdenum oxide, 15.57 grams of silicon oxide, and 50 grams of potassium chloride were mixed with a mortar and pestle and thereafter pelletized, combusted, and processed in accordance with the procedure of such Example. The product obtained contained mainly molybdenum disilicide.

EXAMPLE 6

In substantial accordance with the procedure of Example 5, 11.30 grams of aluminum, 14.7 grams of magnesium, 25.33 g of molybdenum oxide, 21.17 grams of silicon dioxide, and 27.5 grams of diluent were formed into pellets, combusted, washed, and thereater leached with nitric acid; however, the material was not subjected to the sodium hydroxide treatment.

The product obtained contained mainly molybdenum disilicide and aluminum oxide.

EXAMPLE 7

The procedure of Example 6 was repeated, with the exception that 3.84 grams of aluminum, 14.0 grams of magnesium, 18.62 grams of molybdenum oxide, 13.65 grams of silicon dioxide, and 50 grams of potassium chloride were used.

The product obtained contained mainly molybdenum disilicide and alumina.

It is to be understood that the aforementioned description is illustrative only and that changes can be made in the apparatus, the ingredients and their proportions, and in the sequence of combinations and process steps as well as in other aspects of the invention discussed herein without departing from the scope of the invention as defined in the following claims.

We claim:

1. A process for preparing a molybdenum disilicide composition, comprising the steps of sequentially:
   (a) providing a composition comprised of from about 12 to about 34 weight percent of molybdenum oxide, from about 10 to about 29 weight percent of silica, from about 12 to about 36 weight percent of metallic component, and from about 15 to about 60 weight percent of inorganic diluent, wherein:
      1. at least about 90 weight percent of said composition consists of a mixture of said molybdenum oxide, said silica, said metallic component, and said inorganic diluent;
      2. said composition contains less than about 2.0 weight of liquid;
      3. said metal component is selected from the group consisting of aluminum, magnesium, and mixtures of of aluminum and magnesium;
      4. said inorganic diluent is a salt of a metallic compound which has a solubility in cold water of at least 20 grams per 100 cubic centimeters of said cold water;
      5. said inorganic diluent does not decompose at a temperature of from about 1,500 to about 2,000 degrees centigrade; and
      6. at a temperature of from about 1,500 to about 2,000 degrees centrigrade, said inorganic diluent is nonreactive with material selected from the group consisting of molybdenum oxide, molybdenum dislicide, silica, silicon, aluminum, alumina, magnesium, magnesia, molybdenum, and mixtures thereof;
   (b) igniting said composition, thereby causing a self-propagating, metallothermic, exothermic combustion reaction to occur and producing a combusted composition;
   (c) cooling the combusted composition; and
   (d) washing the cooled, combusted composition with water.

2. The process as recited in claim 1, wherein said cooled, combusted composition is washed with water until it contains less than about 0.1 weight percent of said inorganic diluent.

3. The process as recited in claim 2, wherein said inorganic diluent is a salt of an alkali metal compound selected from the group consisting of salts of sodium and potassium.

4. The process as recited in claim 3, wherein said composition comprised of from about 12 to about 34 weight percent of molybdenum oxide, from about 10 to about 29 weight percent of silica, from about 12 to about 36 weight percent of metallic component, and from about 15 to about 60 weight percent of inorganic diluent, is in the form of a pellet.

5. The process as recited in claim 4, wherein said pellet has a minimum size of at least about 0.025 inches.

6. The process as recited in claim 5, wherein said pellet has a minimum size of at least about 0.1 inches.

7. The process as recited in claim 1, wherein said metallic component consists essentially of aluminum.

8. The process as recited in claim 8, wherein said composition is comprised of from about 12 to about 31 weight percent of said aluminum.

9. The process as recited in claim 8, wherein said composition is comprised of from about 14 to about 34 percent of said molybdenum oxide.

10. The process as recited in claim 9, wherein said composition is comprised of from about 11 to about 29 weight percent of said silica.

11. The process as recited in claim 1, wherein said metallic component consists essentially of magnesium.

12. The process as recited in claim 11, wherein said composition is comprised of from about 14 to about 36 weight percent of said magnesium.

13. The process as recited in claim 13, wherein said composition is comprised of from about 12 to about 31 weight percent of said molybdenum oxide.

14. The process as recited in claim 13, wherein said composition is comprised of from about 10 to about 27 weight percent of said silica.

15. The process as recited in claim 3, wherein said inorganic diluent is potassium chloride.

16. The process as recited in claim 1, wherein said composition is comprised of from about 2 to about 5 weight percent of organic binder.

17. The process as recited in claim 16, wherein said organic binder is 2-camphanone.

18. The process as recited in claim 17, wherein said composition is in the form of a pellet.

19. The process as recited in claim 18, wherein said inorganic diluent is potassium chloride.

20. The process as recited in claim 19, wherein said pellet has a minimum size of at least about 0.1 inches.

* * * * *